United States Patent [19]

Campbell et al.

[11] 4,197,995
[45] Apr. 15, 1980

[54] AGRICULTURAL SPRAYING ASSEMBLY

[75] Inventors: Robert J. Campbell; Paul D. Gray, both of Cedar Rapids, Iowa

[73] Assignee: McCord Corporation, Detroit, Mich.

[21] Appl. No.: 960,486

[22] Filed: Nov. 13, 1978

[51] Int. Cl.[2] .................. E03B 7/07; G01F 13/00
[52] U.S. Cl. .................................. 239/74; 137/551; 239/127; 239/575; 340/606
[58] Field of Search ............... 137/551, 552; 340/606; 239/67, 68, 71, 72, 74, 76, 124, 127, 170, 172, 575; 222/23, 40

[56] References Cited

U.S. PATENT DOCUMENTS

| | | | |
|---|---|---|---|
| 2,561,763 | 7/1951 | Waters et al. | 340/606 X |
| 2,639,194 | 5/1953 | Wahlin | 239/575 X |
| 2,988,286 | 6/1961 | Snyder et al. | 239/127 X |
| 3,301,487 | 1/1967 | Young | 239/170 X |
| 3,580,092 | 5/1971 | Scarpa | 340/606 X |
| 3,684,177 | 8/1972 | Barlow | 239/171 |
| 4,023,507 | 5/1977 | van der Lely | 239/71 X |
| 4,052,003 | 10/1977 | Steffen | 239/170 X |
| 4,083,494 | 4/1978 | Ballu | 239/170 X |

*Primary Examiner*—Andres Kashnikow
*Attorney, Agent, or Firm*—McGlynn and Milton

[57] ABSTRACT

An agricultural spraying assembly including a plurality of nozzles divided into groups with each group being supplied liquid through a solenoid valve with a motorized proportioning valve being adjustable to control the pressure supplied to the solenoid valves and, in turn, to the plurality of nozzles. The assembly includes a main control box which is normally situated on a spraying trailer and a remote control box which is normally situated on the pulling tractor and is supplied power from the tractor's battery. Each of the control boxes includes switches for each of the solenoid valves as well as a pressure adjusting switch for adjusting the pressure supplied to the nozzles. Each control box has a pressure gauge for indicating the operating pressure supplied to the nozzles. Each nozzle is supported by a nozzle body with transverse passages, one being a flow-through passage and the other being a nozzle passage with a platform having a wall common with the nozzle passage and a transducer encapsulated in a potting material for responding to vibrations of the flow through the nozzle for providing a signal to the control boxes. In the event the flow through the nozzle is insufficient, the main control box will interpret the signal from the transducer and provide an indication on both of the control boxes. Each nozzle also includes a no-drip valve associated with the inlet end of the nozzle passage for terminating liquid flow to the nozzle passage in the event the pressure of the liquid being supplied is below a predetermined level.

22 Claims, 3 Drawing Figures

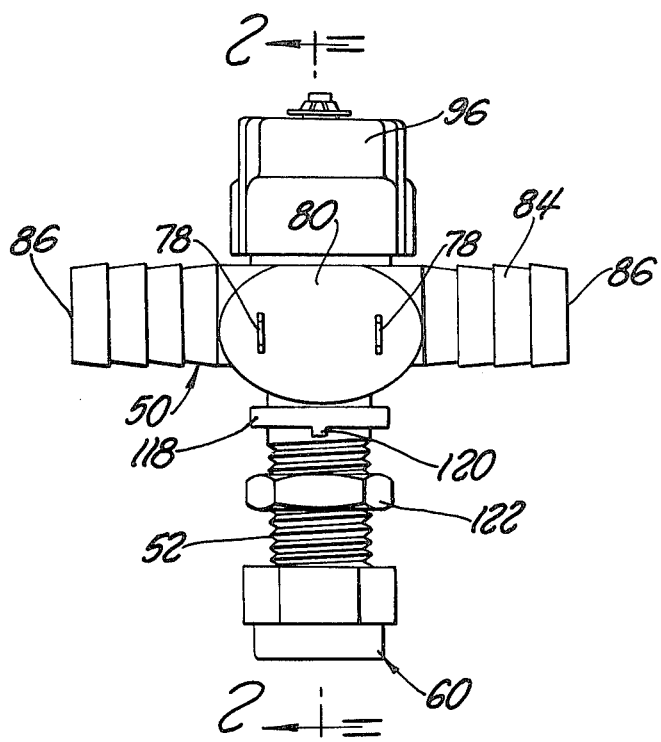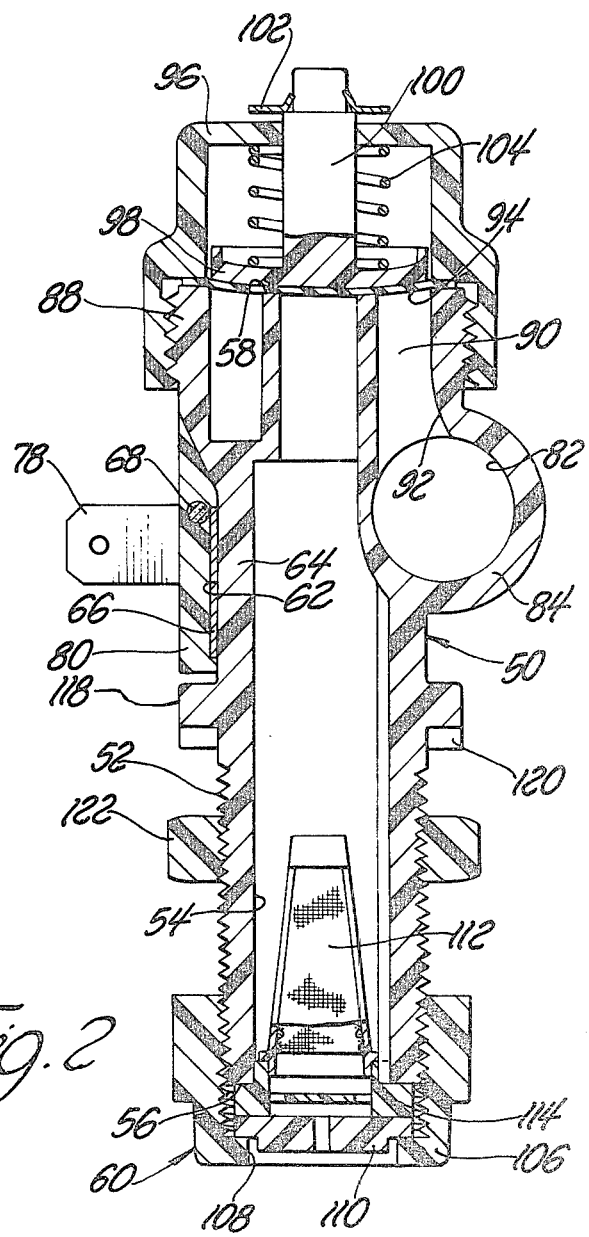

AGRICULTURAL SPRAYING ASSEMBLY

BACKGROUND OF THE INVENTION

1. Field of the Invention

The subject invention relates to an agricultural spraying assembly of the type utilized to spray agricultural crops. Typically, a large chemical supply tank is supported on a wheeled vehicle such as a bed of a pick-up truck or upon a trailer which may be towed by a tractor. At the rear of the vehicle there will be an elongated beam extending horizontally and fixed to the vehicle. This central beam will carry a plurality of nozzles for spraying crops as the vehicle moves across the field. Additionally, there may be a boom hinged to each end of the central beam whereby the booms extend a great distance laterally to cover additional rows of crops. When the vehicle is not being used for spraying the booms may be hinged upwardly to cross one another above the central beam. The total width of the spraying path with such boom arrangements are typically between twenty and sixty feet.

2. Description of the Prior Art

In typical agricultural spraying systems the operator cannot always see the various nozzles on the central beam or end booms to determine whether or not liquid is being dispensed from the nozzles and onto the crops. Such a problem is particularly difficult when spraying at night or in dusty fields and, of course, many of the nozzles are not in view of the driver of the vehicle. This is a particular problem because, if the nozzles are believed to be spraying and are not, many acres of crops may inadvertently not be sprayed. Additionally, it frequently occurs that the agriculturist will wish a different spray pattern from the nozzles for different spraying conditions. The subject invention solves many of the problems of the prior art systems.

SUMMARY OF THE INVENTION

In accordance with one aspect of the invention, there is provided an agricultural spraying assembly including first and second nozzle means with first and second valve means for respectively controlling the liquid flow to the nozzle means with a supply of liquid to the valve means with a pressure regulating means for regulating the pressure of the liquid supplied to the valve means and control means for opening and closing the valve means to control the liquid flow to the respective first and second nozzle means and for adjusting the regulating means to change the pressure of liquid supplied to the first and second valve means with first and second sensing means respectively associated with the first and second nozzle means for responding to liquid flow through the respective nozzle means.

In accordance with another aspect of the invention, there is provided an agricultural spraying assembly including a nozzle body supporting a nozzle and including a nozzle passage through which liquid flows to the nozzle with the body having a platform, the bottom of which is defined by a wall common to the nozzle passage and a transducer disposed on the platform adjacent the wall for responding the vibrations resulting from the flow of liquid through the nozzle with potting material covering the remainder of the platform and the transducer with electrical leads extending from the transducer through the potting material with a control valve for controlling liquid flow to the nozzle passage and a pressure regulator for regulating the pressure of liquid supplied to the control valve and a control box in electrical contact with the electrical leads of the transducer and the control valve and the pressure regulator with the control box including a switch for opening and closing the control valve and a pressure control switch for adjusting the pressure regulator and an indicator means for providing an indication in response to the output of the transducer to indicate insufficient flow through the nozzle.

In accordance with another aspect of the invention, there is provided a spray nozzle assembly including a nozzle body having a nozzle passage through which liquid flows with the nozzle passage having an inlet end and an outlet end with the nozzle supported by the body at the outlet end and the body having a platform with a wall common to the nozzle passage and a transducer disposed on the platform adjacent the wall for responding to vibrations resulting from the flow of liquid through the nozzle with potting material covering the remainder of the platform to encapsulate the transducer with leads from the transducer extending through the potting material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view of the preferred embodiment of the nozzle assembly of the subject invention;

FIG. 2 is an enlarged cross-sectional view taken substantially along line 2—2 of FIG. 1.

DESCRIPTION OF PREFERRED EMBODIMENT

Figure 3:
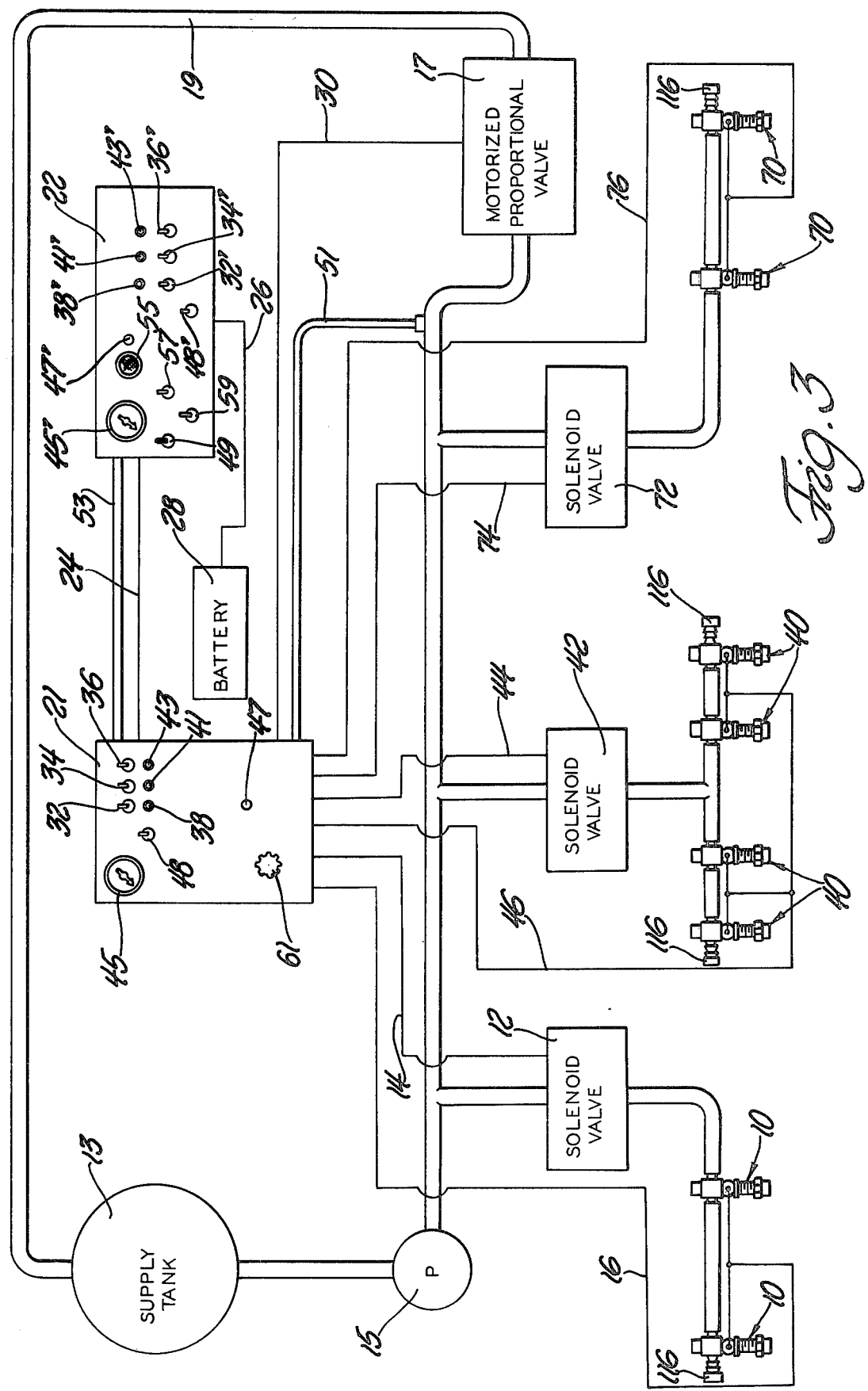
FIG. 3 is a schematic illustration of the agricultural spraying assembly of the subject invention including the nozzles shown in FIGS. 1 and 2.

Referring first to FIG. 3, a preferred embodiment of an agricultural spraying assembly is shown in schematic form. There is included a first nozzle means comprising the first plurality of nozzles generally indicated at 10. There is also included a second nozzle means comprising a plurality of nozzles generally indicated at 40. There is a third nozzle means including the plurality of nozzles generally inicated at 70. The nozzles 10, 40 and 70 are identical and there may be any number of groups, however, in the illustrated embodiment the nozzles 40 would normally be associated with a central elongated beam centrally of a spraying vehicle whereas the nozzles 10 and 70 would respectively be on booms extending laterally from the beam. There may, of course, be any number of nozzles in each of the respective groups. Each of the nozzles 10, 40 and 70 direct or spray liquid over a predetermined area or in a predetermined pattern.

The assembly also includes a first valve means comprising the solenoid valve 12 for controlling liquid flow to the nozzles 10. In a similar fashion, there is a second valve means comprising the solenoid valve 42 for controlling liquid flow to the nozzles 40. Further, a third valve means comprising the solenoid valve 72 controls liquid flow to the nozzles 70.

There is also included a liquid supply means for supplying liquid to the valves 12, 42 and 72. Specifically, the liquid supply means includes a supply tank 13 and a pump 15.

The assembly also includes a pressure regulating means comprising the motorized proportioning or proportional valve 17 for regulating the pressure of liquid supplied to the solenoid valves 12, 42 and 72. The motorized proportional valve 17 is located downstream of the solenoid valves 12, 42 and 72 and from the pump 15 in a return line 19 which establishes liquid communication from the valve 17 back to the supply tank 13. As the proportional valve 17 is opened by an electrical motor, the pressure of liquid being supplied to the solenoid valves 12, 42 and 72 decreases. In other words, the proportional valve 17 allows the liquid to flow back through the return line 19 to the supply tank thereby decreasing the pressure of the liquid being supplied to the nozzles 10, 40 and 70 when the valves 12, 42 and 72 are open.

The assembly also includes control means for opening and closing the solenoid valves 12, 42 and 72 and for adjusting the proportional valve 17 to change the pressure of the liquid supplied to the valve 12, 42 and 72. More specifically, the control means includes a main control box 21 and a remote control box 22. The remote control box 22 is electrically connected to the main control box 21 by the electrical leads 24. The remote control box 22 includes a power connection 26 for supplying electrical power from the battery 28 through the remote control box 22 to the main control box 21. As alluded to above, normally the main control box 21 is disposed on the spraying vehicle adjacent the spraying nozzles 10, 40 and 70, whereas the remote control box 22 is disposed adjacent the operator, such as upon the tractor, with the main control box 21 disposed upon the trailer.

The solenoid valve 12 is electrically connected to the main control box 21 through the lead 14. In a similar fashion, solenoid valve 42 is connected to the main control box 21 through lead 44 and solenoid valve 72 is connected to the main control box 21 through lead 74. The motorized proportional valve 17 is connected to the main control box 21 through the electrical leads 30.

Each of the nozzles 10, 40 and 70 include sensing means associated with the nozzles for responding to the liquid flow through the respective nozzles to provide a signal. The sensing means associated with the nozzles 10 are connected to the main control box 21 through the leads or cable 16. In a similar fashion, the sensing means associated with the nozzles 40 are connected to the main control box through the leads or cable 46. The leads or cable 76 connects the sensing means associated with the nozzles 70 with the main control box 21.

Each of the control boxes 21 and 22 includes a first switch 32 and 32' for opening and closing the first solenoid valve 12. In a similar fashion, each of the control boxes 21 and 22 include a second switch 34 and 34' for opening and closing the second solenoid valve 42. A third switch 36 and 36' is disposed in each of the control boxes 21 and 22 for opening and closing the solenoid valve 72. Thus, all of the valves 12, 42 and 72 may be controlled from either the control box 21 or from the remote control box 22. It will be apparent that liquid flow to the nozzles 10 may be controlled independently of the liquid flow to the nozzles 40 and 70 respectively.

In addition, each of the control boxes 21 and 22 includes an indicator means comprising a light 38 and 38' for providing an indication that solenoid valve 12 is open, allowing liquid flow to the nozzles 10. In a similar fashion, each of the control boxes 21 and 22 includes a second indicator means comprising lights 41 and 41' to indicate solenoid valve 42 is open. A third indicator means or light 43 and 43' at the respective control boxes 21 and 22 indicates solenoid valve 72 is open.

The control boxes 21 and 22 also include the pressure control switches 48 and 48' for adjusting the motorized proportional valve 17 to change the pressure of the liquid supplied to the valves 12, 42 and 72 and, hence, changing the pressure of the liquid supplied to the nozzles 10, 40 and 70 respectively. Remote control box 22 includes a switch 49 to change the speed at which the motor valve 17 operates, providing fast speed for large pressure changes and slow speed for precise pressure changes. In addition, each of the control boxes includes a pressure gauge 45 and 45' for indicating the presure of the liquid supplied to the valves 12, 42 and 72. The pressure is transmitted through a small tube 51 to main control box 21 through a second small tube 53 to the remote control box 22. Each of the control boxes also includes a light 47 and 47' that lights to indicate insufficient liquid flow through any of the nozzles. The remote control box 22 includes a buzzer 55 for providing an audio sound whenever the lights 47 and 47' light up to indicate insufficient liquid flow through any of the nozzles. Switch 57 will switch the buzzer "on" to function or "off" to not function. The remaining switch 59 on the remote control box 22 is a power "on" and power "off" switch. Knob 61 is a control to set threshold level or pressure about which indicator lamp 47, 47' and buzzer 55 will indicate improper flow through the nozzles.

As stated above, each of the nozzle assemblies 10, 40 and 70 are identical and will be described in connection with FIGS. 1 and 2. The nozzle assembly includes a nozzle body generally indicated at 50. The nozzle body 50 has a cylindrical extension 52 having threads on the exterior thereof and defining the outlet end of a nozzle passage 54. The nozzle passage 54 has an outlet end 56 and an inlet end 58. A nozzle assembly generally indicated at 60 is supported on the cylindrical extension 52 of the body 50 at the outlet end 56 of the nozzle passage 54.

The body 50 has a platform which could be a cavity but which has a bottom defined by a wall 64 which is common to the nozzle passage 54. A transducer 66 comprising a piezoelectric crystal is disposed on the platform adjacent the wall 64 for responding to vibrations resulting from the flow of liquid through the nozzle assembly 60. The transducer 66 is the sensing means for sensing flow. The transducers are all connected to the main control box through the leads 16, 46 and 76 respectively. A transducer also includes a solid state element 68 and the electrical leads 78. A potting material 80 covers the remainder of the platform 62 and/or encapsulates the entire transducer with the electrical leads 78 extending out through the potting material for connection to electrical leads.

The body 50 also includes a flow-through passage 82 defined by tubular member 84 which has open ends 86 spaced equally from the axis of the cylindrical extension 52. The flow-through passage 82 and the tubular member 84 extend transversely to the nozzle passage 54 at a position between the outlet and inlet ends 56 and 58 of the nozzle passage 54. The flow-through passage 82 is spaced laterally from the nozzle passage 54 and is not in direct fluid communication with the nozzle passage 54. The flow-through passage 82 is disposed on the opposite side of the nozzle passage 54 from the transducer 66. The body 50 includes an outer annular wall 88 defining an annular cavity 90 surrounding the inlet end 58 of the nozzle passage 54. A crossover passage 92 establishes liquid communication between the flow-through passage 82 and the annular cavity 90 and, hence, the inlet end 58 of the nozzle passage 54.

A no-drip valve is disposed at the inlet end 58 of the nozzle passage 54 for preventing the flow of liquid into the nozzle passage 54 when the liquid pressure in the flow-through passage 82 falls below a predetermined level. The no-drip valve includes a diaphragm 94 extending across the extremity of the annular wall 88 and over the inlet end 58 of the nozzle passage 54. The annular wall 88 has threads about the exterior thereof and a cover 96 is threaded to the exterior of the annular wall 88. A backing member 98 engages the diaphragm 94 for urging the diaphragm 94 against the inlet end 58 of the nozzle passage 54. The backing member 98 is movalbe relative to the cover 96 and includes a stem 100 extending through the cover 96 with a clip 102 secured to a reduced diameter portion of the stem 100 for retaining the cover member assembled to the backing member 98. A spring 104 is disposed about the stem 100 to react between the cover 96 and the backing member 98 to urge the diaphragm 94 against the inlet end 58 of the nozzle passage 54. The backing member 98 and the stem 100 are an integral unitary member made of plastic.

The nozzle assembly 10 includes a retaining cap 106 threaded onto the cylindrical extension 52 with a central opening 108. A nozzle plate 110 having a central aperture defining the nozzle is retained within the cap 106 in the opening 108. A filter assembly including a conical filter member 112 and a plastic base member 114 are disposed within the cylindrical extension 52 at the outlet end 56 and are retained therein by the retaining cap 106 as the member 114 is urged against the outlet end 56 of the extension 52.

As illustrated schematically in FIG. 3, end caps 116 may be disposed on the open ends 86 of the end nozzle at the extremity of each plurality of nozzles. Each plurality of nozzles is supplied liquid through a solenoid valve to a line which connects the nozzles in series.

The body 50 includes an annular flange 118 with a radially extending key or lug 120. The assembly may be disposed in an opening in a bracket with the lug 120 extending through a slot in the bracket to prevent rotation of the entire assembly. A nut 122 threadedly engages the threads on the cylindrical extension 52 to engage the underside of such a bracket for maintaining the assembly in position and secured to a mounting bracket.

In operation, the power "on" switch 59 on the remote control box 22 would be moved to the "on" position. The operator would go to the main control box 21, move the appropriate switches 32, 34 and 36 to open the control valves 12, 42 and 72 to allow fluid under pressure to be delivered to the respective nozzles. Of course, if all of the nozzles were not required, all of the valves 12, 42 and 72 would not be opened. The operator would then adjust the pressure desired to be delivered to the respective nozzles by operating the pressure switch 48 and examining the spray pattern. The transducers associated with each nozzle would respond to the flow and provide a continuous signal to the main control box 21 and that signal would be interpreted by appropriate circuitry to provide both an audio indication through the buzzer 55 and to light the lights 47 and 47' if any of the nozzles were experiencing insufficient flow. Actually, the circuitry scans the signals from the transducers to ascertain that sufficient flow is occuring through each nozzle. The adjustment 61 is provided at the main control box 21 to adjust the flow at which the transducer would be interpreted as indicating an insufficient flow. In the event that the pressure supplied to the individual nozzles is insufficient to move the diaphragm 94 upwardly against the biasing action of the spring 104, liquid flow into the nozzle passage 54 would be discontinued and therefore there would be no dripping of fluid out through the nozzle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specificially described.

The embodiments of the invention in which an exclusive property or privilege is claimed are defined as follows:

1. A spraying nozzle assembly comprising; a nozzle body having a nozzle passage through which liquid flows, said nozzle passage having an inlet end and an outlet end, a nozzle supported by said body at said outlet end of said nozzle passage, said body having a platform with the bottom of the platform being defined by a wall common to said nozzle passage, a transducer disposed on said platform adjacent said wall for responding to vibrations resulting from the flow of liquid through the nozzle, potting material covering the remainder of said platform to encapsulate said transducer, and electrical leads extending from said transducer through said potting material.

2. An assembly as set forth in claim 1 wherein said body includes a flow-through passage extending transversely to said nozzle passage between said inlet and outlet ends of said nozzle passage and spaced laterally from said nozzle passage, said flow-through passage being disposed on the opposite side of said nozzle passage from said transducer.

3. An assembly as set forth in claim 2 including a crossover passage establishing liquid communication between said flow-through passage and said inlet end of said nozzle passage.

4. An assembly as set forth in claim 3 including a no-drip valve disposed at said inlet end of said nozzle passage for preventing the flow of liquid into said nozzle passage when the liquid pressure in said flow-through passage falls below a predetermined level.

5. An assembly as set forth in claim 4 wherein the outlet end of said nozzle passage is defined by a cylindrical extension having threads on the exterior thereof, said nozzle includes a retaining cap threaded onto said cylindrical extension with a central opening and a nozzle plate retained within said cap and in said opening.

6. An assembly as set forth in claim 5 including a filter assembly disposed within said cylindrical extension at said outlet end and retained therein by said retaining cap.

7. An agricultural spraying assembly comprising; a nozzle body supporting a nozzle and including a nozzle passage through which liquid flows to said nozzle, said body having a platform with the bottom of the platform being defined by a wall common to said nozzle passage, a transducer disposed on said platform adjacent said wall for responding to vibrations resulting from the flow of liquid through the nozzle, potting material encapsulating said transducer and covering the remainder of said platform, electrical leads extending from said transducer through said potting material, a control valve for controlling liquid flow to said nozzle passage in said nozzle body, a pressure regulator for regulating the pressure of liquid supplied to said control valve, a control box in electrical contact with said electrical leads of said transducer and said control valve and said pressure regulator, said control box including a switch for opening and closing said control valve, said control box including a pressure control switch for adjusting said pressure regulator to change the pressure of liquid supplied to said control valve, said control box including indicator means for providing an indication in response to the output of said transducer to indicate insufficient flow through said nozzle.

8. An assembly as set forth in claim 7 wherein said control box includes a pressure gauge for indicating the pressure of liquid supplied to said control valve.

9. An assembly as set forth in claim 8 wherein said control valve comprises a solenoid actuated valve.

10. A spraying nozzle assembly comprising; a nozzle body having a nozzle passage through which liquid flows, said nozzle passage having an inlet end and an outlet end, a nozzle supported by said body at said outlet end of said nozzle passage, said body having a platform with the bottom of the platform being defined by a wall common to said nozzle passage, a transducer disposed on said platform adjacent said wall for responding to vibrations resulting from the flow of liquid through the nozzle, potting material covering the remainder of said platform to encapsulate said transducer, and electrical leads extending from said transducer through said potting material, said body including a flow-through passage extending transversely to said nozzle passage between said inlet and outlet ends of said nozzle passage and spaced laterally from said nozzle passage, said flow-through passage being disposed on the opposite side of said nozzle passage from said transducer, a crossover passage establishing liquid communication between said flow-through passage and said inlet end of said nozzle passage, a no-drip valve disposed at said inlet end of said nozzle passage for preventing the flow of liquid into said nozzle passage when the liquid pressure in said flow-through passage falls below a predetermined level, the outlet end of said nozzle passage being defined by a cylindrical extension having threads on the exterior thereof, said nozzle including a retaining cap threaded onto said cylindrical extension with a central opening and a nozzle plate retained within said cap and in said opening, a filter assembly disposed within said cylindrical extension at said outlet end and retained therein by said retaining cap, said body including an outer annular wall defining an annular cavity surrounding said inlet end of said nozzle passage, said crossover passage extending between said flow-through passage and said annular cavity, said no-drip valve including a diaphrapm extending across the extremity of said annular wall and over said inlet end of said nozzle passage, said annular wall having threads about the exterior thereof, a cover threaded to said exterior of said annular wall, a backing a member engaging said diaphragm for urging said diaphram against said inlet end of said nozzle passage, said backing member being movable relative to said cover with a stem extending through said cover, a spring disposed about said stem to react between said cover and said backing member to urge said diaphragm against said inlet end of said nozzle passage, clip means engaging said stem exteriorly of said cover to retain said backing member and said cover assembled, and said flow-through passage being defined by a tubular member having open ends spaced equally from the axis of said cylindrical extension defining said nozzle passage.

11. An agricultural spraying assembly comprising: first nozzle means for spraying a first predetermined area, second nozzle means for spraying a second predetermined area, first valve means for controlling liquid flow to said first nozzle means, second valve means for controlling liquid flow to said second nozzle means, liquid supply means for supplying liquid to said first and second valve means, pressure regulating means for regulating the pressue of liquid supplied to said first and second valve means, control means for opening and closing said first and second valve means and for adjusting said regulating means to change the pressure of liquid supplied to said first and second valve means, first sensing means associated with said first nozzle means for responding to liquid flow through said first nozzle means, and second sensing means associated with said second nozzle means for responding to liquid flow through said second nozzle means, each of said nozzle means including at least one nozzle body having fluid passages and a nozzle, said sensing means including a transducer supported by each of said nozzle bodies for responding to vibrations resulting from the flow of liquid through the adjacent nozzle, and circuit means for electrically connecting each transducer to said control means, each of said nozzle bodies being made of plastic and including a platform on the side thereof with the bottom of the platform being defined by a wall which also defines a wall of the passage through which liquid flows to said nozzle thereof, said transducer being disposed on said platform adjacent said wall, potting material covering the remainder of said platform to encapsulate said transducer, and electrical leads extending from said transducer through said potting material.

12. An assembly as set forth in claim 11 wherein said control means includes a main control box and a remote control box connected electrically to said main control box.

13. An assembly as set forth in claim 12 wherein each of said control boxes includes a first switch for opening and closing said first valve means and a second switch for opening and closing said second valve means whereby said valve means may be controlled from either of said control boxes.

14. An assembly as set forth in claim 13 wherein each of said control boxes includes an indicator for providing an indication in response to said first sensing means and said second sensing means to indicate insufficient flow through said first nozzle means and said second nozzle means at both of said control boxes.

15. An assembly as set forth in claim 14 wherein each of said control boxes include a pressure control switch for adjusting said regulating means to change the pressure of liquid supplied to said valve means from either of said control boxes.

16. An assembly as set forth in claim 15 wherein each of said control boxes includes a pressure gauge for indicating the pressure of liquid supplied to said valve means.

17. An assembly as set forth in claim 16 wherein each of said valve means comprises a solenoid actuated valve electrically connected to said control boxes.

18. An assembly as set forth in claim 17 wherein said regulating means is located downstream of said valves from said liquid supply means, and including a return line establishing liquid communication from said regulating means back to said liquid supply means whereby the pressure of liquid to said valves decreases as said regulating means allows more liquid to return to said liquid supply means.

19. An assembly as set forth in claim 18 wherein said liquid supply means includes a supply tank and a pump downstream of said supply tank.

20. An assembly as set forth in claim 19 wherein said regulating means comprises a motorized proportional valve electrically connected to said control boxes.

21. An assembly as set forth in claim 20 wherein said remote control box includes a power connection for supplying electrical power through said remote control box to said main control box.

22. An assembly as set forth in claim 21 wherein each of said valve bodies includes a no-drip valve for preventing the flow of liquid to said nozzle when the liquid pressure supplied thereto falls below a predetermined level.

* * * * *